United States Patent [19]

Martin

[11] Patent Number: 4,524,270
[45] Date of Patent: Jun. 18, 1985

[54] APPARATUS FOR READING A LINE MARKING FIXED TO A CARRIER

[75] Inventor: Hans Martin, Thalwil, Switzerland

[73] Assignee: Emhart Industries, Inc., Farmington, Conn.

[21] Appl. No.: 537,630

[22] Filed: Sep. 30, 1983

[30] Foreign Application Priority Data

Oct. 1, 1982 [CH] Switzerland .................... 5790/82

[51] Int. Cl.³ ............................................. G06K 19/06
[52] U.S. Cl. .................................... 235/494; 235/462
[58] Field of Search ................................ 235/494, 462

[56] References Cited

U.S. PATENT DOCUMENTS 4,488,768 12/1984 Hara ............................. 235/462 X Primary Examiner—Harold I. Pitts
Attorney, Agent, or Firm—Arthur B. Moore

[57] ABSTRACT

The apparatus comprises an optical arrangement which displays longitudinal extending short or long elements of a marking in time sequence on a reading surface. The surface is divided into more than three consecutive sectors and a pulse signal indicating an element of any length is produced if an element is displayed on at least one sector. A code signal indicating a long element is produced if an element is displayed simultaneously on at least two sectors which are separated from each other by at least one other sector.

7 Claims, 4 Drawing Figures

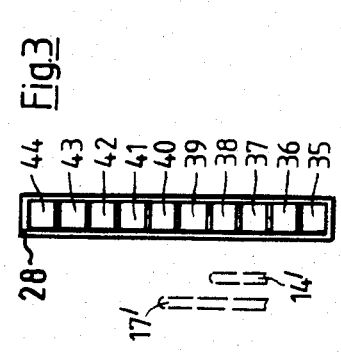
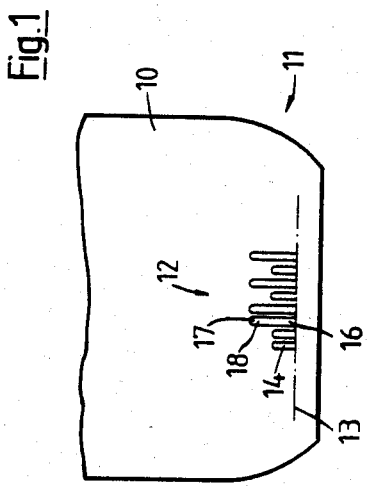
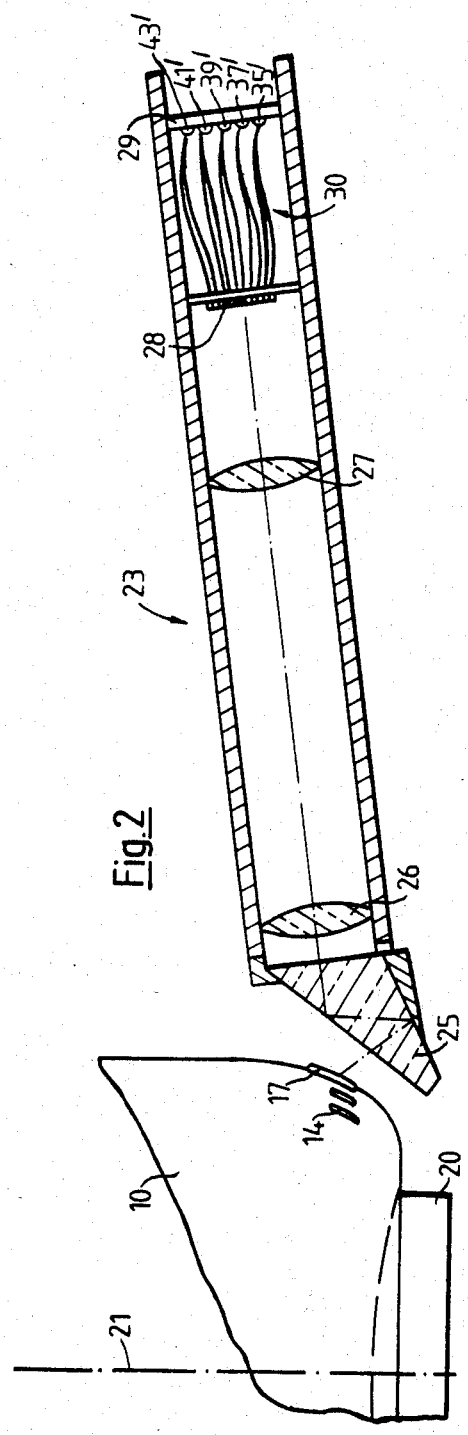

APPARATUS FOR READING A LINE MARKING FIXED TO A CARRIER

BACKGROUND OF THE INVENTION

The invention relates to a apparatus for reading a line marking fixed to a carrier, the marking having longitudinal elements of different lengths which are substantially perpendicular to a joint, imaginary line, shorter elements being for use as pulse generator markings and longer elements being for use both as pulse generator markings and code symbols. The elements are not necessarily continuous as they may comprise several dots. The apparatus operates with an optical arrangement which displays the elements in time sequence on a reading surface in the movement of the marking carrier in the direction of the imaginary line.

Line markings of various types and apparatuses for reading such markings are customarily used for different applications and in different forms. A first known version, in which the markings are printed on the flat surface of a packaging container, is disclosed and described for instance in U.S. Pat. No. 3,651,465 (Law et al). Another known version, in which the markings are affixed in relief on the curved wall of a container, is described for instance in Swiss Pat. No. 607161 (Emhart) which corresponds to U.S. Pat. No. 4,201,338 and German Pat. No. 27 26 162.

The apparatuses for reading the markings which were disclosed in the said publications have two optoelectronic converters, of which one is linked to the pulse generator markings and the other to the code symbols. To ensure that the markings and symbols act only on the appropriate converter, the entire marking needs to be moved across the reading range of the device and along a specific path, and the individual elements of the marking must not be off-set in their longitudinal direction or be outside the specific range.

These conditions are relatively easily fulfilled in the case of the first markings mentioned in that the markings and the symbols are relatively long and the distance between the optoelectronic converters in the reading device is relatively large.

In the case of the second version mentioned, these conditions are however difficult to fulfil. The reasons for this lie both with the container and its manufacture and with the guide mechanism forming part of the reading device.

The length of the elements is restricted because the markings are preferably fixed on the base inlet of the container wall so as not to protrude above the side wall. Furthermore, each marking to be affixed must be individually engraved on a mould, so that relatively large tolerances with regard to the length of the line marking and the mutual alignment of the lines are inevitable. Finally, the moulds are subject to gradual deformation during use and the hot-formed containers sag during the cooling process, both of which can lead to deformations in the markings.

The support surface of the guide mechanism, in which a container is rotated so that the marking can be read, is exposed to continuous wear and tear which will alter the position of the containers in the guide mechanism and, thus, the position of the markings in the reading range. Furthermore, the high speeds used to transport the glass containers through the reading device make it inevitable that a container is raised when being rotated in the retention rollers which will also result in a displacement of the markings outside the reading range. Finally, it is also possible that a container is not rotated around the correct axis or that it is not properly round, so that the markings will not be accurately displayed by the optical system on the optoelectronic converters.

Due to the possible defects shown in both the markings and the guide mechanism, known reading apparatuses cannot read the markings fixed to containers with the required accuracy in the short time available.

The invention therefore has the object of providing an apparatus for reading line markings fixed to a carrier which allows the individual elements of the marking to be read in an accurate manner, even if these elements are of a relatively short length and are off-set in their longitudinal direction as a group or relative to one another.

BRIEF SUMMARY OF THE INVENTION

According to the invention, the object is achieved by means of an apparatus for reading a line marking fixed to a carrier, the marking having longitudinal elements of different lengths which are substantially perpendicular to a joint, imaginary line, shorter elements being for use as pulse generator markings and longer elements being for use both as pulse generator markings and code symbols, the apparatus acting with an optical arrangement which displays the elements in time sequence on a reading surface in the movement of the marking carrier in the direction of the imaginary line, characterised in that the reading surface is divided into more than three consecutive sectors and that each sector is linked to an optoelectronic converter, and in that a first electronic switching mechanism produces a pulse signal if one element of the marking is displayed on at least one sector of the reading surface, and in that a second electronic switching mechanism produces a code signal if one element of the marking is simultaneously displayed on at least two sectors, which are separated from each other by at least one other sector or a preselectable number of other sectors.

Conveniently, the first electronic switching mechanism is in the form of an OR-gate.

If it is desired to use two sectors for the shorter elements, the first electronic switching mechanism produces a pulse signal if the element is simultaneously displayed on at least two adjacent sectors of the reading surface, and in that the second electronic switching mechanism produces a code signal if the element of the marking is simultaneously displayed on at least three sectors, with at least two of the sectors being adjacent and the third or subsequent sectors being separated by at least one sector from the two adjacent sectors, the arrangement being such that the sector corresponding to the base line of the line marking is one of the two adjacent sectors or is separated by those sectors from the third or subsequent sectors.

Conveniently, the second electronic switching mechanism has a number of AND-gates with two inputs each, these AND-gates forming a sequence, which corresponds to the sequence of the converters, in which a first input of each AND-gate is linked to the output of the corresponding converter and the other input of each AND-gate being connectable to the output of a converter corresponding to a sector, which, in the sequence stated, is separated by at least one sector from the sector linked to the first input of the same AND-gate, and in which the output of each AND-gate is linked to a corresponding input of an OR-gate.

In order to provide adjustability, the apparatus comprises a system for the optional linking of the other inputs of the AND-gates with the outputs of other converters which are separated by more then one sector from the converter linked to the first input.

In order to enable the optoelectronic converters to be more compactly arranged the sectors are formed by the entry points of a bundle of glass fibres.

Apparatus according to the invention allows an error-free reading of markings with relatively short elements, even if these markings are displaced across the specified path of the reading range or if individual elements are off-set in their longitudinal direction in relation to other elements.

BRIEF DESCRIPTION OF THE DRAWINGS

The accompanying drawings show, by way of example, an apparatus in accordance with the invention.

In the drawings:

FIG. 1 is a side elevation of the lower part of a glass container with the line markings affixed to the side wall adjacent to the base;

FIG. 2 is a diagrammatic view of part of a container in the guide mechanism and of the optical arrangement for the display of the container markings on a reading surface;

FIG. 3 is a diagrammatic view of the reading surface inside the optical arrangement.

The same reference numbers were used in the Figures to describe the same or corresponding components.

DETAILED DESCRIPTION

Figure 4:
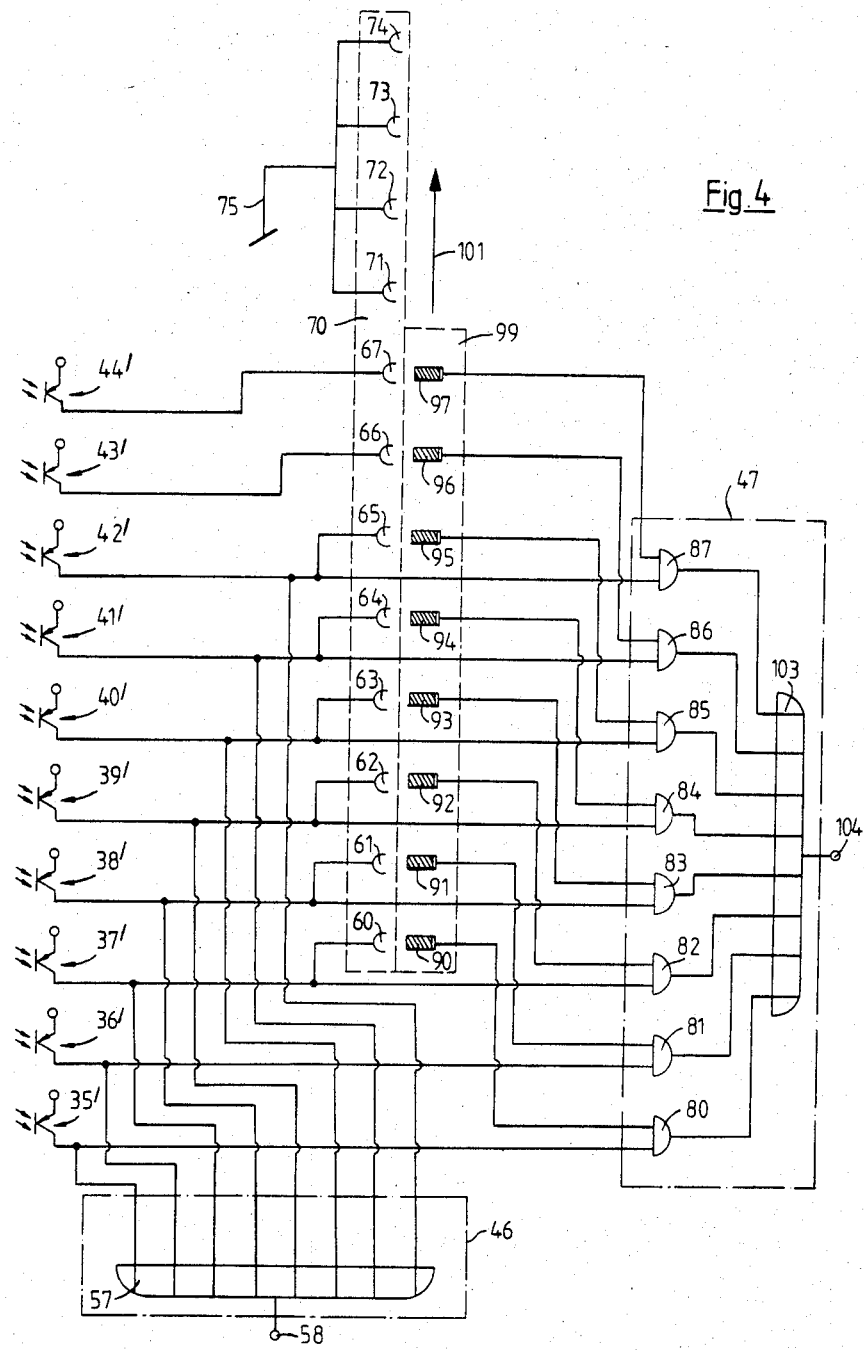
FIG. 4 is a block diagram of the optoelectronic converter with the first and second electronic switching mechanisms.

The apparatus shown in the drawings is for reading a line marking fixed to a container, the marking having longitudinal elements of different lengths which are substantially perpendicular to a joint, imaginary line.

FIG. 1 shows the lower part of a glass container 10 whose side wall 11 adjacent its base contains a marking 12. The elements of this marking are of different lengths and stand vertically on an imaginary base line 13. The shorter elements, e.g. element 14, and the lower part of the longer elements, e.g. part 16 of element 17, are used as pulse generator markings; the upper parts of the longer elements, e.g. the upper part 18 of element 17, are used as code symbols which appear simultaneously with the pulse generator marking. The shape of these elements in the form of optic lenses or reflectors, and the reading of the elements by transmitted or reflected light are described in detail in the German patent mentioned in the above, to which specific reference is made in this context. A repetition of this version is therefore not necessary.

FIG. 2 shows a diagrammatic view of part of a container 10 on the support surface 20 of the rotating assembly of a reading device. The container is provided with a marking as per FIG. 1 of which only the first three elements are visible in the position shown. The container is maintained in an accurately defined position by the rotating assembly, and turned around its vertical axis 21. Such rotating assemblies are known to every specialist in the trade, and are described in detail in the Swiss Pat. No. 570912 (Emhart) for example, to which specific reference is made in this context.

The apparatus also comprises an optical arrangement 23, at the side of the support surface and, thus, at the side of the side wall adjacent to the base of the container. This arrangement 23 contains a prism 25, a first and second lens system 26 and 27, and a reading surface 28. The arrangement is fixed in a mechanical holder (not shown), which allows a radial displacement compared with axis 21, any vertical displacement and any change in the inclination compared with the level of support surface 20. With this holder, the position of the arrangement can be selected prior to the start of a measuring sequence so that the elements of a marking passing through the reading range are sharply displayed on the reading surface 28 in time sequence in the rotary movement of the container in the direction of the imaginary line 13.

FIG. 3 shows how the reading surface 28 is divided into more than three (ten in the example shown) consecutive square sectors 35 to 44 one above the other. Each sector is formed by the entry point of a bundle of glass fibres, whose outlet end (preferably of a circular shape) is linked to an optoelectronic converter, for example a photodiode 35' to 44'. The use of glass fibre bundles 30 allows a division of the reading surface into sectors whose dimensions are smaller than the dimensions of currently available photodiodes, and to attribute photodiodes, which are arranged in several adjacent rows on a plate 29 in order to save space, to the sectors being superimposed and arranged in one row.

FIG. 4 shows the block diagram with ten photodiodes 35' to 44' and the first and second electronic switching mechanisms 46 and 47. The sequence of the diodes shown corresponds to the sequence of the sectors of the reading surface 28, in which the diode 35' is attributed to the lowermost sector 35 shown in FIG. 3, and diode 44' to the uppermost sector 44.

The first electronic switching mechanism 46 is in the form of an OR-gate 57 and produces a pulse signal if one element of the marking 12 is displayed on at least one sector of the reading surface 28. Each input of this OR-gate 57 is connected to the output of a corresponding photodiode 35' to 44'. The output of OR-gate 57 is linked with the output terminal 58 of the first electronic switching mechanism where the pulse signal can be measured.

Each signal output of the third and subsequent photodiode 37' to 44' in the sequence shown is also connected to a corresponding output contact 60 to 67. These output contacts are arranged on a strip 70, which is also provided with four additional contacts 71 to 74 with the latter being jointly linked to an earth conductor 75.

The second electronic switching mechanism 47 produces a code signal if one element of the marking 12 is simultaneously displayed on at least two sectors of the reading surface 28, the sectors being separated from each other by at least one other sector of a preselectable number of sectors. The mechanism 47 contains a group of eight AND-gates 80 to 87. The AND-gates 80 to 87 form a sequence which corresponds to the sequence of the photodiodes 35' to 44', in which a first input of each AND-gate is linked to the output of the corresponding photodiode and the other output of each AND-gate is connectable to the output of a photodiode corresponding to a sector which, in the sequence stated, is separated by at least one sector from the sector linked to the first input of the same AND-gate. The first input of each AND-gate (the lower input shown in FIG. 4) is connected to the output of a corresponding photodiode, e.g. the one output of AND-gate 70 with the output of photodiode 35'. The other input of each AND-gate (the upper input shown in FIG. 4) is linked with a corresponding input contact 90 to 97, with these input contacts being arranged on a connector strip 99. The connector strip 99 can be moved from its position shown in FIG. 4, in which the output contact 60 and the input contact 90 form a current-conducting connection. This movement can be made in the direction of arrow 101 so that the input contact 90 forms a current-conducting connection with the output contact 16 or 62 or 63 or 64, for example. When moving the connector strip (from its position shown in FIG. 4), the first output contact 60 or the first two or three or four output contacts 60 and 61 or 60 to 62 or 60 to 63 remain unconnected and the last input contacts 97 or 97 and 96 or 97, 96 and 95 or 97, 96, 95 and 94 are connected to the earth conductor 75. The strip 99 provides a system for the optional linking of the other inputs of the AND-gates 80 to 87 with the outputs of other photodiodes which are separated by more than one sector from the photodiodes linked to the first input.

The outputs of the AND-gates 80 to 87 are each connected to a corresponding input of a second OR-gate 103, whose output leads to a terminal 104 where the code signal can be measured.

The description of the functioning of the apparatus assumes that the marking 12 of a container 10 is rotated across the reading range of the optical arrangement 23, as shown in FIG. 2. The image of the shorter element 14 is arranged to be displayed on at least two adjacent sectors, e.g. sectors 37 and 38, and that of the longer element on at least four adjacent sectors, for example on sectors 37 to 40 of the reading surface 28, as shown by the dotted lines in FIG. 3. The lower edge of the elements shown is to be between the second and third sectors 36 and 37 (counted from the bottom).

If the shorter element 14 is displayed on the third and fourth sectors 37 and 38 of the reading surface 28, a signal is formed on the outputs of the corresponding photodiodes 37' and 38'. The signal from diode 37' is passed to an input of the OR-gate 57 and to one of the inputs of the AND-gate 82, whilst the signal from diode 38' is fed to another input of the OR-gate 57 and to one of the inputs of the AND-gate 83. Then, an output signal will appear at the output of the OR-gate 57 which can be measured as a pulse signal at the output terminal 58.

As already described, the output signal of the photodiode 37' is also passed to the one input of the AND-gate 82. There, the signal remains however without effect since the other input of this AND-gate, which is linked to the signal output of the photodiode 39' via the output contact 62 and the input contact 92, is not excited.

If the image 14' of element 14 is displaced towards the top or bottom compared with the position shown in FIG. 3, an output signal appears for example on photodiodes 36' and 37' or 38' and 39'. These signals are passed to the OR-gate 57 where a pulse signal is produced at its output. As can also be seen in FIG. 4, the displacement of the image of element 14 in a vertical direction, as shown by way of example, will not result in the activation of any of the AND-gates 81 to 84, so that there is no output signal on the output terminal 104 of the OR-gate 103.

If the longer element 17 is displayed on the third to sixth sector 37 to 40 of the reading surface 28 (counted from the bottom), as shown by the dotted line of element 17' in FIG. 3, then a signal appears at the outputs of the photodiodes 37' to 40' corresponding to these sectors. These signals are passed to the inputs of the OR-gate 57 in the same way as described for the image of the shorter element 14. A pulse signal then appears at its output or at the output terminal 58 connected to its output.

The output signals of the photodiodes 37' to 40' are also directly fed to the first inputs of the corresponding AND-gates 82 to 85 and to the other inputs of the AND-gates 80 to 83 via the output contacts 60 to 62 and the input contacts 90 to 93. There will then be a signal at both inputs of the AND-gates 82 and 83, so that these gates are activated in order to send an output signal to the corresponding inputs of the OR-gate 103. A code signal is then produced at the output of the OR-gate which can be measured at the output terminal 104.

The signals which are fed to the other inputs of AND-gates 80 and 81 by the photodiodes 37' and 38' have no effect since the photodiodes 35' and 36' are not activated and therefore supply no signal to the first inputs of said AND-gates.

As any specialist can see from FIG. 4, the apparatus produces a pulse signal if at least one photodiode produces an output signal, and a pulse and a code signal if an output signal is produced by at least two photodiodes, which are separated from each other by another photodiode. This mode of operation is irrespective of which photodiode or which group of photodiodes in the sequence shown produces an output signal.

In the position shown in FIG. 4, the connector strip 99 acts in such a way that a code signal is produced only if an output signal is produced by the uppermost and the lowermost of at least three adjacent photodiodes, as shown in the Figure. If the connector strip is moved by one position (towards the top), so that the output contact 61 is connected to the input contact 90 for example, then a code signal is produced only if the lowermost and the uppermost of at least four adjacent photodiodes produce an output signal, as shown in the Figure. Thus, a move of strip 99 in the direction of the arrow 101 will result in an increased distance between the sectors on the reading surface which release the pulse signal and the code signal in the case of markings with relatively long elements 17, so that the reading accuracy will be improved.

It goes without saying that the pulse signal and the code signal appear simultaneously at the output terminals 58 and 104. These signals can be processed in a number of different ways and, particularly, be used for the excitation of an optical display device. This type of signal processing or evaluation is known to every specialist in the trade, so that we can refrain from mentioning further details in this context.

With a version of the invention which was tested in practice, a marking 12 whose elements have a width of approximately 1 mm and a height of 2.4 or 5 mm was read. The optical arrangement formed the marking on the reading surface 28 at a scale of 1:1. The reading surface was divided into ten sectors, and each sector corresponded to a square area with a side length of 0.8 mm. The diameter of the photodiodes amounted to approximately 1.6 mm, which is why the light is transmitted via glass fibre bundles from the small sector surface to the larger photodiode.

It goes without saying that the apparatus described herein can be adapted to specific operating conditions without any problems. For example, it is possible to use an optical arrangement which reproduces the elements of the marking on the reading surface at an enlarged or reduced scale. The reading surface may contain more or less than the ten sectors described, in which case the number of photodiodes and AND-gates in both the first and second group would need to be correspondingly increased or reduced. It is, of course, also possible to form the reading surface from adjacent photodiodes, in which case the useful surface of each photodiode would correspond to one sector of the reading surface. The connector strip with the input contacts for the other inputs of the AND-gates in the second group can be dispensed with, or the positions of this connector strip can be increased to more than the four positions shown. Furthermore, it is possible to link the inputs to the OR-gate 57 and AND-gates so that the first switching mechanism 46 produces a pulse signal if the element is displayed simultaneously on at least two adjacent sectors 35 to 44 of the reading surface. In that case, the second switching mechanism 47 is modified to produce a code signal if the element is simultaneously displayed on at least three sectors, with at least two of the sectors being adjacent and the third or subsequent sectors being separated by at least one sector from the two adjacent sectors. The base line 13 of the marking will, in this case, be one of the two adjacent sectors or be separated by those sectors from the third or subsequent sectors.

I claim:

1. Apparatus for reading a line marking fixed to a carrier, the marking having longitudinal elements of different lengths which are substantially perpendicular to a joint, imaginary line, shorter elements being for use as pulse generator markings and longer elements being for use both as pulse generator markings and code symbols, the apparatus acting with an optical arrangement which displays the elements in time sequence on a reading surface in the movement of the marking carrier in the direction of the imaginary line, wherein the reading surface is divided into more than three consecutive sectors and that each sector is linked to an optoelectronic converter, and in that a first electronic switching mechanism produces a pulse signal if one element of the marking is displayed on at least one sector of the reading surface, and in that a second electronic switching mechanism produces a code signal if one element of the marking is simultaneously displayed on at least two sectors, which are separated from each other by at least one other sector or a preselectable number of other sectors.

2. Apparatus according to claim 1, wherein the first electronic switching mechanism is in the form of an OR-gate.

3. Apparatus according to claim 1, wherein the first electronic switching mechanism produces a pulse signal if the element is simultaneously displayed on at least two adjacent sectors of the reading surface, and in that the second electronic switching mechanism produces a code signal if the element of the marking is simultaneously displayed on at least three sectors, with at least two of the sectors being adjacent and the third or subsequent sectors being separated by at least one sector from the two adjacent sectors, the arrangement being such that the sector corresponding to the base line of the line marking is one of the two adjacent sectors or is separated by those sectors from the third or subsequent sectors.

4. Apparatus according to claim 1, wherein the second electronic switching mechanism has a number of AND-gates with two inputs each, these AND-gates forming a sequence, which corresponds to the sequence of the converters, in which a first input of each AND-gate is linked to the output of the corresponding converter and the other input of each AND-gate being connectable to the output of a converter corresponding to a sector, which, in the sequence stated, is separated by at least one sector from the sector linked to the first input of the same AND-gate, and in which the output of each AND-gate is linked to a corresponding input of an OR-gate.

5. Apparatus according to claim 4, wherein the number of AND-gates is smaller than the number of sectors or converters.

6. Apparatus according to claim 4, wherein it comprises a system for the optional linking of the other inputs of the AND-gates with the outputs of other converters which are separated by more than one sector from the converter linked to the first input.

7. Apparatus according to claim 1, wherein the sectors are formed by the entry points of a bundle of glass fibres.

* * * * *